United States Patent
Wang

(10) Patent No.: US 12,525,222 B2
(45) Date of Patent: Jan. 13, 2026

(54) METHOD OF TRAINING NATURAL LANGUAGE PROCESSING MODEL METHOD OF NATURAL LANGUAGE PROCESSING, AND ELECTRONIC DEVICE

(71) Applicant: BOE TECHNOLOGY GROUP CO., LTD., Beijing (CN)

(72) Inventor: Bingqian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 18/547,711

(22) PCT Filed: Aug. 24, 2022

(86) PCT No.: PCT/CN2022/114369
§ 371 (c)(1),
(2) Date: Aug. 24, 2023

(87) PCT Pub. No.: WO2023/030105
PCT Pub. Date: Mar. 9, 2023

(65) Prior Publication Data
US 2024/0185840 A1 Jun. 6, 2024

(30) Foreign Application Priority Data
Aug. 30, 2021 (CN) .......................... 202111008140.X

(51) Int. Cl.
*G10L 15/06* (2013.01)
*G10L 15/18* (2013.01)
(52) U.S. Cl.
CPC ............ *G10L 15/063* (2013.01); *G10L 15/18* (2013.01)

(58) Field of Classification Search
USPC ...................................................... 704/1–504
See application file for complete search history.

(56) References Cited

U.S. PATENT DOCUMENTS 8,706,472 B2 * 4/2014 Ramerth ................. G06F 40/53
704/251
12,183,326 B2 * 12/2024 Xu ........................... G10L 15/06
(Continued)

FOREIGN PATENT DOCUMENTS

CN 106527757 A 3/2017
CN 106601246 A 4/2017
(Continued)

OTHER PUBLICATIONS

Chinese First Office Action & Search Report dated May 30, 2024, relating to CN Patent Application No. 202111008140.X.

*Primary Examiner* — Marcus T Riley
(74) *Attorney, Agent, or Firm* — DINSMORE & SHOHL LLP

(57) ABSTRACT

The present disclosure relates to a method of training a natural language processing model, a method of natural language processing, and an electronic device. The method of training a natural language processing model includes: acquiring corpus data for training; processing the corpus data by using a natural language processing model to obtain output information, wherein the natural language processing model includes a first model for correcting pinyin data of the corpus data and a second model for performing text transformation on the corrected pinyin data of the corpus data; and training the natural language processing model according to the output information of the natural language processing model to obtain the trained natural language processing model.

19 Claims, 5 Drawing Sheets

(56) References Cited

U.S. PATENT DOCUMENTS

| | | | |
|---|---|---|---|
| 2015/0057994 A1* | 2/2015 | Fang | G06F 40/253 |
| | | | 704/4 |
| 2017/0169813 A1* | 6/2017 | Suzuki | G10L 15/197 |
| 2021/0248309 A1* | 8/2021 | Zhang | G06F 40/232 |
| 2024/0185840 A1* | 6/2024 | Wang | G10L 15/063 |

FOREIGN PATENT DOCUMENTS

| | | | | |
|---|---|---|---|---|
| CN | 108549637 A | * | 9/2018 | G06F 40/211 |
| CN | 109992765 A | * | 7/2019 | G06F 16/353 |
| CN | 110110041 A | | 8/2019 | |
| CN | 111090720 A | * | 5/2020 | G06F 16/31 |
| CN | 111354343 A | * | 6/2020 | G10L 13/10 |
| CN | 111369980 A | * | 7/2020 | G10L 25/51 |
| CN | 111951805 A | * | 11/2020 | G06N 3/045 |
| CN | 109783648 B | | 12/2020 | |
| CN | 112232062 A | | 1/2021 | |
| CN | 112509581 A | | 3/2021 | |
| CN | 110427608 B | * | 6/2021 | G06N 3/084 |
| CN | 113178193 A | | 7/2021 | |
| CN | 113192497 A | | 7/2021 | |
| CN | 113223509 A | | 8/2021 | |
| CN | 113626563 A | * | 11/2021 | G10L 15/18 |
| CN | 113396455 B | * | 4/2025 | G06F 40/58 |
| WO | WO-2014134971 A1 | * | 9/2014 | G06F 16/3337 |
| WO | 2019153996 A1 | | 8/2019 | |
| WO | WO-2022007823 A1 | * | 1/2022 | G06N 3/045 |
| WO | WO-2022116445 A1 | * | 6/2022 | G06N 3/044 |

* cited by examiner

METHOD OF TRAINING NATURAL LANGUAGE PROCESSING MODEL, METHOD OF NATURAL LANGUAGE PROCESSING, AND ELECTRONIC DEVICE

CROSS-REFERENCE TO RELATED APPLICATIONS

The present application is a U.S. National Stage Application under 35 U.S.C. § 371 of International Patent Application No. PCT/CN2022/114369, filed on Aug. 24, 2022, which is based on and claims the priority to the Chinese patent application No. 202111008140.X filed on Aug. 30, 2021, the disclosure of both of which are incorporated herein by reference in its entirety.

TECHNICAL FIELD

The present disclosure relates to the technical field of natural language processing, and in particular, to a method of training a natural language processing model, a method of natural language processing, an electronic device, and a computer-readable storage medium.

BACKGROUND

Natural language processing (NLP) is an important direction in fields of computer science and artificial intelligence. The natural language processing studies various theories and methods enabling efficient communication in a natural language between a human and a computer. For example, various corpus data, such as speech data and text data, can be processed by using natural language processing technologies.

With the development of artificial intelligence (AI) algorithms and hardware technologies such as AI chips, intelligent devices have been widely used in daily life, such as speech control systems of smart home, smart speakers, and conference record generation for an intelligent conference system.

However, in a process of speech interaction, due to factors such as an accent of a speaker, environmental noise, or homophones in sentence content itself, a speech recognition error occurs. Moreover, the speech recognition error will be transferred and amplified step by step and accumulated to a subsequent link, finally resulting in failure of a downstream task. Therefore, correction of a recognition result of an acoustic model becomes particularly important.

SUMMARY

According to some embodiments of the present disclosure, there is provided a method of training a natural language processing model, comprising:
acquiring corpus data for training;
processing the corpus data by using a natural language processing model to obtain output information, wherein the natural language processing model comprises a first model for correcting pinyin data of the corpus data and a second model for performing text transformation on the corrected pinyin data of the corpus data; and
training the natural language processing model according to the output information of the natural language processing model to obtain the trained natural language processing model.
In some embodiments, the training the natural language processing model according to the output information of the natural language processing model to obtain the trained natural language processing model comprises:
calculating a first loss function by using a difference between a model prediction value and a true label value of the first model;
calculating a second loss function by using a difference between a model prediction value and a true label value of the second model; and
training the natural language processing model according to the first loss function and the second loss function.
In some embodiments, the processing the corpus data by using a natural language processing model to obtain output information comprises:
transforming the corpus data into pinyin data;
for the pinyin data of the corpus data, constructing a similar pinyin set;
performing embedded coding processing on the pinyin data of the corpus data to obtain embedding vector data;
processing the embedding vector data by using the first model to obtain the corrected pinyin data; and
performing pinyin-to-word transformation on the corrected pinyin data by using the second model.
In some embodiments, the performing embedded coding processing on the pinyin data of the corpus data to obtain embedding vector data comprises:
performing random masking processing on at least one pinyin in the pinyin data of the corpus data to obtain randomly masked pinyin data; and
performing embedded coding processing on the randomly masked pinyin data to obtain the embedding vector data.
In some embodiments, the randomly masking the pinyin data of the corpus data comprises:
randomly determining at least one pinyin to be masked; and
performing random masking processing on the at least one pinyin.
In some embodiments, the performing random masking processing on the at least one pinyin comprises:
masking the at least one pinyin with a first probability, replacing the at least one pinyin with similar pinyin with a second probability, and changing tone of the at least one pinyin with a third probability.
In some embodiments, the training the natural language processing model according to the output information of the natural language processing model to obtain the trained natural language processing model comprises:
for the at least one pinyin that is randomly masked, calculating a first loss function by using a difference between a model prediction value and a true label value of the first model;
for the pinyin data of the corpus data, calculating a second loss function by using a difference between a model prediction value and a true label value of the second model; and
training the natural language processing model according to a weighted sum of the first loss function and the second loss function.
In some embodiments, the calculating the first loss function comprises calculating the first loss function by using a cross-entropy loss function according to a size of an original data dictionary constructed based on the pinyin data of the corpus data; and the calculating the second loss function comprises calculating the second loss function by using a cross-entropy loss function according to a size of a target data dictionary constructed based on the corpus data.

In some embodiments, the first model comprises N1 coding modules and the second model comprises N2 coding modules, the second model further comprising, in addition to the N1 coding modules of the first model, an additional coding module, wherein N1, N2 are positive integers greater than 1, N2>N1, the N1 coding modules are connected in series, and the N2 coding modules are connected in series.

In some embodiments, the first model further comprises a first fully-connected layer and a first activation function layer, and the second model further comprises a second fully-connected layer and a second activation function layer.

In some embodiments, the constructing, for the pinyin data of the corpus data, a similar pinyin set comprises: constructing the similar pinyin set based on a correspondence between fuzzy sounds and based on an edit distance.

In some embodiments, the performing embedded coding processing on the randomly masked pinyin data to obtain embedding vector data comprises:
performing embedded coding processing on the randomly masked pinyin data to obtain a first embedding matrix and a second embedding matrix; and
determining the embedding vector data according to the first embedding matrix and the second embedding matrix.

In some embodiments, the first embedding matrix is a token embedding matrix and the second embedding matrix is a position embedding matrix, the embedding vector data being in linear correlation with the first embedding matrix and the second embedding matrix.

In some embodiments, element values in the first embedding matrix and the second embedding matrix are training parameters of the natural language processing model.

According to other embodiments of the present disclosure, there is provided a method of natural language processing, comprising:
acquiring corpus data to be processed; and
processing the corpus data by using a natural language processing model to obtain output information, wherein the natural language processing model comprises a first model for correcting pinyin data of the corpus data and a second model for performing text transformation on the corrected pinyin data of the corpus data.

According to still other embodiments of the present disclosure, there is provided a method of natural language processing, comprising:
training the natural language processing model by using the method according to any of the above embodiments to obtain the trained natural language processing model; and
processing corpus data to be processed by using the trained natural language processing model.

According to some embodiments of the present disclosure, there is provided a method of speech recognition, comprising:
acquiring speech to be recognized;
transforming the speech to be recognized into pinyin data;
correcting the pinyin data by using a natural language processing model, and recognizing word corresponding to the corrected pinyin data, wherein the natural language processing model comprises a first model for correcting the pinyin data and a second model for performing text transformation on the corrected pinyin data; and
outputting the recognized word.

According to other embodiments of the present disclosure, there is provided a method of text input, comprising:
acquiring pinyin data to be processed;
correcting the pinyin data by using a natural language processing model, and transforming the corrected pinyin data into word, wherein the natural language processing model comprises a first model for correcting the pinyin data and a second model for performing text transformation on the corrected pinyin data; and
inputting the transformed word.

In some embodiments, the method further comprises: training the natural language processing model by using the method according to any of the above embodiments.

In some embodiments, the method further comprises: outputting the corrected pinyin data.

According to some embodiments of the present disclosure, there is provided an electronic device, comprising: a memory; and a processor coupled to the memory, the processor being configured to perform, based on instructions stored in the memory, the method according to any of the embodiments of the present disclosure.

According to other embodiments of the present disclosure, there is provided a computer-storable medium having thereon stored computer program instructions which, when executed by a processor, implement the method according to any of the embodiments of the present disclosure.

Other features of the present disclosure and advantages thereof will become apparent through the following detailed description of exemplary embodiments thereof, which proceeds with reference to the accompanying drawings.

BRIEF DESCRIPTION OF THE DRAWINGS

The accompanying drawings, which constitute part of the specification, illustrate the embodiments of the present disclosure and together with the description, serve to explain the principles of the present disclosure.

The present disclosure may be more clearly understood according to the following detailed description with reference to the accompanying drawings, in which.

It should be understood that a size of each portion shown in the drawings is not drawn according to an actual scale. Furthermore, identical or similar reference numerals denote identical or similar components.

DETAILED DESCRIPTION

Figure 1:
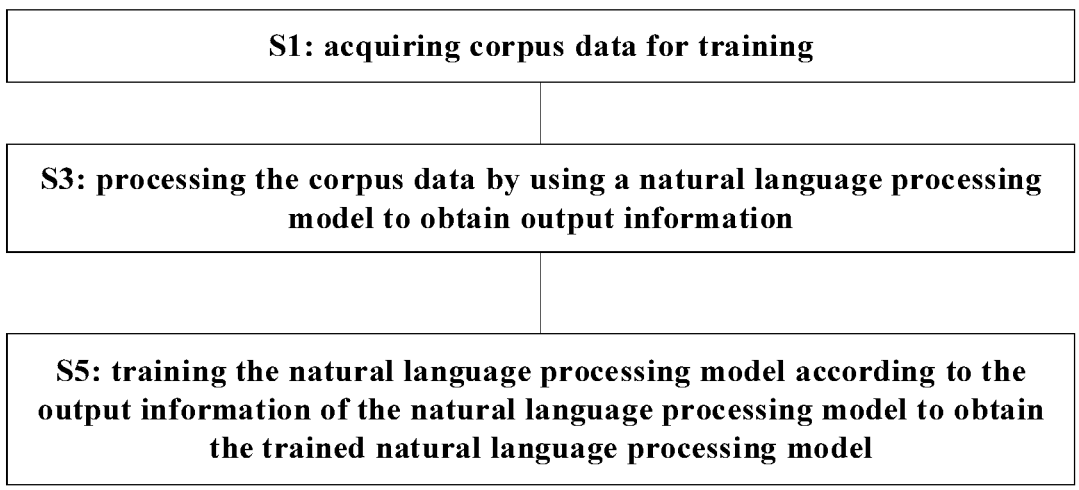
FIG. 1 is a flow diagram illustrating a method of training a natural language processing model according to some embodiments of the present disclosure.

Various exemplary embodiments of the present disclosure will now be described in detail with reference to the accompanying drawings. The description of the exemplary embodiments is merely illustrative and is in no way intended to limit this disclosure and its application or use. The present disclosure may be implemented in many different forms and is not limited to the embodiments described herein. These embodiments are provided so that this disclosure will be thorough and complete, and will fully convey the scope of the present disclosure to those skilled in the art. It should be noted that: the relative arrangement of components and steps set forth in these embodiments should be construed as exemplary only and not as a limitation unless specifically stated otherwise.

All terms (including technical or scientific terms) used in the present disclosure have the same meanings as those understood by one of ordinary skill in the art to which this disclosure belongs unless specifically defined otherwise. It should be further understood that terms defined in such as a universal dictionary, should be interpreted as having meanings consistent with their meanings in the context of the related art, and should not be interpreted in idealized or overly formalized meanings unless expressly so defined herein.

Techniques, methods, and devices known to one of ordinary skill in the related art might not be discussed in detail but are intended to be part of the description where appropriate.

Speech recognition can be roughly divided into five stages: preprocessing, extraction of an acoustic feature, training of an acoustic model, training of a language model, and decoding. The acoustic model and the language model are two core modules of a model of a speech recognition system, and respectively correspond to calculation of a speech-to-syllable probability and calculation of a syllable-to-word probability.

The acoustic model may be trained by methods such as deep neural networks (DNN) after features are extracted form a large amount of audio with already annotated text. Optimization of the acoustic model depends on a large amount of audio which is field-related, content-enriched, and accurately annotated.

A recognition result of the acoustic model directly affects an output of the language model, thereby affecting accuracy of a final result. Therefore, correction of the recognition result of the acoustic model becomes particularly important.

Correction methods known to the inventors are all to correct text recognized by automatic speech recognition (ASR), for example, to screen sentence forming probabilities of the text of the ASR recognition result by using an N-Gram model, so as to improve accuracy of the ASR recognition result, and for another example, to correct the ASR-recognized text based on a confusion set and a candidate vocabulary library. However, the processing based on the ASR-recognized text requires additional work and has no portability.

In view of the above technical problem, the present disclosure provides a language model for ASR that integrates pinyin correction and pinyin-to-word transformation.

According to the present disclosure, the accuracy based on ASR recognition can be effectively improved, and the accuracy of transformation can also be improved for applications in other pinyin-to-word transformation scenarios. In addition, according to the present disclosure, required training corpus can be constructed by directly using a corpus data set for training the ASR acoustic model, without an additional data set manually annotated, and with better universality.

FIG. 1 is a flow diagram illustrating a method of training a natural language processing model according to some embodiments of the present disclosure.

As shown in FIG. 1, the method of training a natural language processing model comprises: step S1, acquiring corpus data for training; step S3, processing the corpus data by using a natural language processing model to obtain output information; and step S5, training the natural language processing model according to the output information of the natural language processing model to obtain the trained natural language processing model.

In the step S1, the corpus data for training may be obtained by processing annotation text of ASR training corpus. In some embodiments, the annotation text of ASR training corpus is taken as a true label value (which may also be referred to as target data) of a model prediction result; and based on, for example, a pypinyin processing packet, the annotation text is transformed to corresponding pinyin as an input (which may also be referred to as original data) to the model. For example, annotation text is "please adjust the temperature of the conditioner to 20 degree (请将空调的温度调到 20 度)", and its transformed pinyin is "qing3 jiang1 kong1 tiao2 de1 wen1 du4 tiao2 dao4 er2 shi1 du4", where an Arabic numeral represents a tone. It should be understood that the pinyin here is not limited to Chinese pinyin, but may also be, for example, romaji representing Japanese pronunciation. Accordingly, the annotation text is not limited to Chinese characters, but may also be, for example, kana or kanji in Japanese.

In the step S3, the natural language processing model comprises a first model and a second model. The first model is used for correcting pinyin data of the corpus data. The second model is used for performing text transformation on the corrected pinyin data of the corpus data.

In some embodiments, the first model comprises N1 coding modules and the second model comprises N2 coding modules, wherein N1 and N2 are positive integers greater than 1, the N1 coding modules are connected in series, and the N2 coding modules are connected in series. The second model further comprises, in addition to the N1 coding modules of the first model, an additional coding module, i.e. N2>N1.

The coding module is, for example, an coding module using a Transformer model. A structure of the natural language processing model according to some embodiments of the present disclosure is described in detail below in conjunction with FIG. 2.

Figure 2:
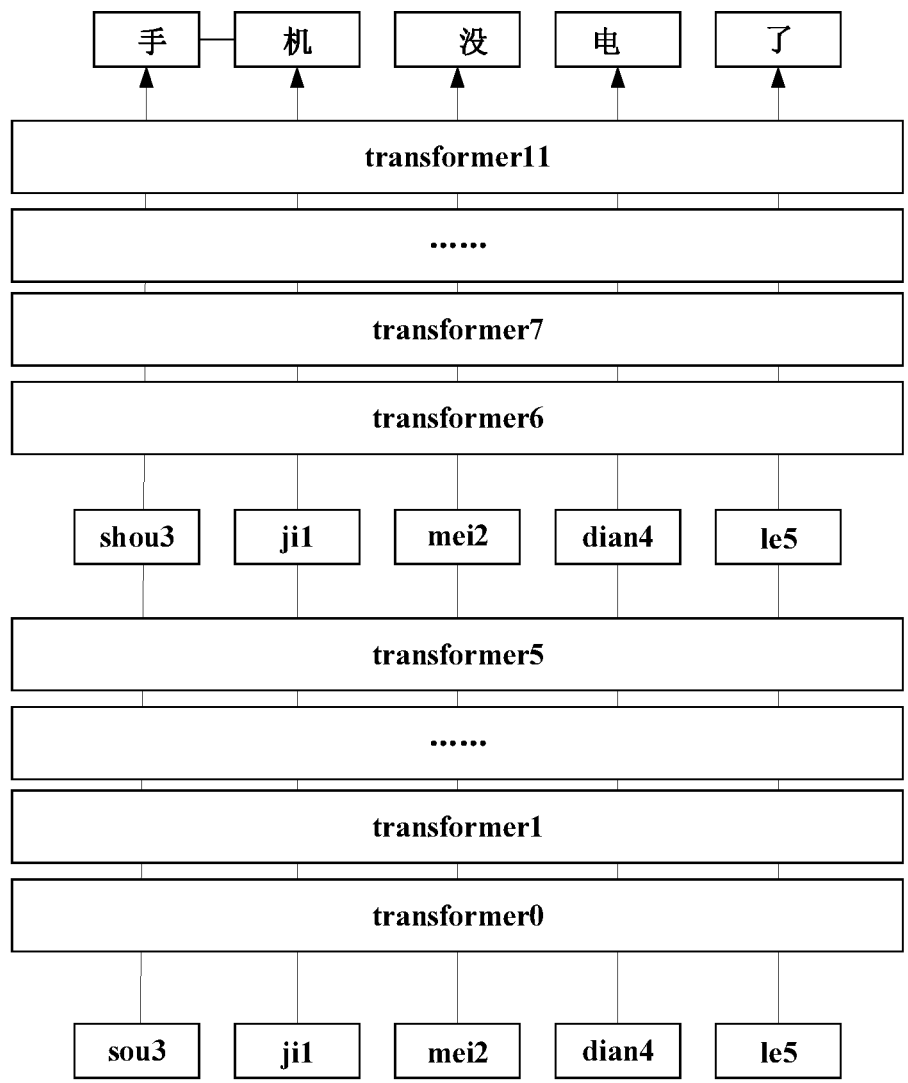
FIG. 2 is a schematic diagram illustrating a natural language processing model according to some embodiments of the present disclosure.

As shown in FIG. 2, the first model comprises 6 coding modules, namely transformer0, transformer1 . . . and transformer5, which are used for correcting pinyin data "sou3 ji1 mei2 dian4 le5" of the inputted corpus data, to obtain corrected pinyin data "shou3 ji1 mei2 dian4 le5". The second model further comprises, in addition to the 6 coding modules of the first model, 6 coding modules, namely transformer7, transformer 8 . . . and transformer 11, that is, the second model comprises 12 coding modules, for performing text transformation on the corrected pinyin data to obtain output information "The mobile phone is out of power (手机没电了)".

In the above embodiment, an error at the input end is corrected by using the networks of the first 6 layers; and pinyin-to-word mapping transformation is performed by using the networks of all the 12 layers. Of course, a specific number of layers of networks can be adjusted according to actual needs.

How to process the corpus data by using the natural language processing model is further described in detail below in conjunction with FIG. 3.

Figure 3:
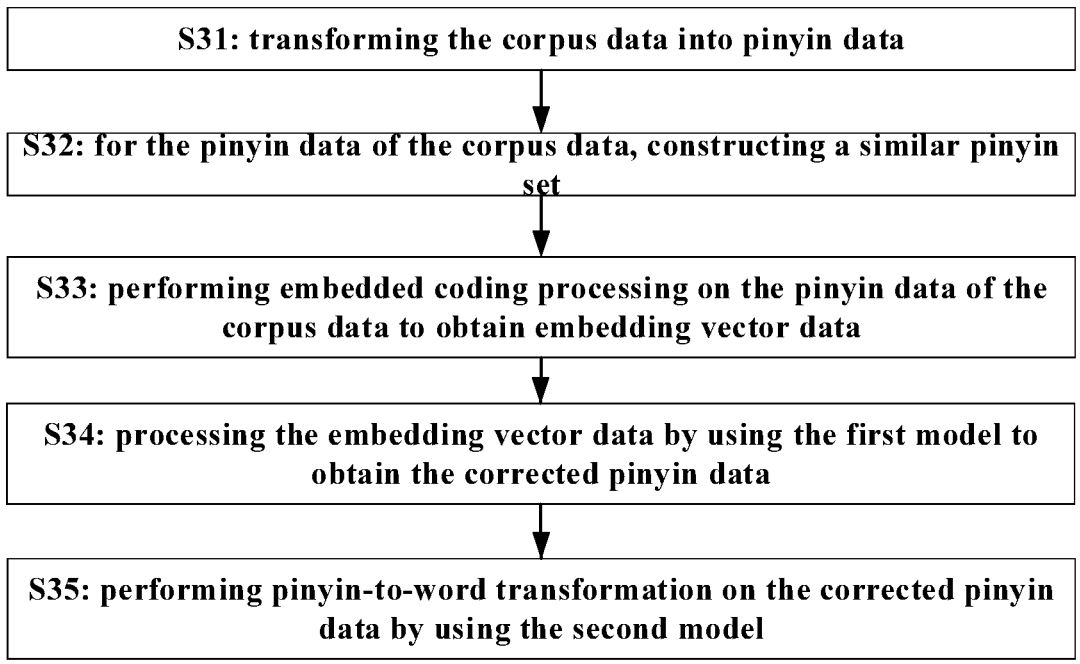
FIG. 3 is a flow diagram illustrating processing corpus data by using a natural language processing model according to some embodiments of the present disclosure.

As shown in FIG. 3, the processing the corpus data by using a natural language processing model to obtain output information comprises: step S31, transforming the corpus data into pinyin data; step S32, for the pinyin data of the corpus data, constructing a similar pinyin set; step S33, performing embedded coding processing on the pinyin data of the corpus data to obtain embedding vector data; step S34, processing the embedding vector data by using the first model to obtain corrected pinyin data; and step S35, performing pinyin-to-word transformation on the corrected pinyin data by using the second model.

In the step S31, as described above, the corpus data for training, i.e., the annotation text, may be transformed into corresponding pinyin data by using, for example, a pypinyin processing packet.

In the step S32, the similar pinyin set may be constructed for the pinyin data, by using, for example, a fuzzy-sound algorithm.

A correspondence between fuzzy sounds can comprise a correspondence between the initial of one syllable and the initial of another syllable of fuzzy sounds and a correspondence between the finals of syllables of fuzzy sounds. For example, the correspondence between the initials of fuzzy sounds comprises s<-->sh, c<-->ch, z<-->zh, l<-->n, f<-->h, r<-->l, etc.; the correspondence between the finals of fuzzy sounds comprises an<-->ang, en<-->eng, in<-->ing, ian<-->iang, and uan<-->uang, etc.

In some embodiments, the similar pinyin set is constructed based on the correspondence between fuzzy sounds and based on an edit distance. The edit distance characterizes a difference such as an N-Gram distance between similar strings. For example, a similar pinyin set corresponding to pinyin 'zhuang' may comprise: 'zhang', 'chuang', 'zhuan', 'shuang', 'zang', etc.

In the process of constructing the similar pinyin set, a dictionary for training can be constructed. The dictionary may include an original data dictionary and a target data dictionary. The original data dictionary may include a set of all Chinese characters appearing in the corpus data, with a size of src_vocab_size. The target data dictionary may include a set of pinyin corresponding to Chinese characters, with a size of tgt_word_size. The constructing of the similar pinyin set is mainly for elements in the original data dictionary.

Both the original data dictionary and the target data dictionary may include notations such as PAD, CLS, SEP, MASK, and UNK. The PAD is used for text filling and aligning. The CLS and SEP are special mark symbols (or token) for a BERT (Bidirectional Encoder Representations from Transformers) model. The CLS mark is typically placed in a first place of a first sentence. The SEP mark is used for separating two input sentences, for example, for input sentences A and B, the SEP marks will be added after the sentences A and B. The MASK mark is used for randomly masking data, e.g., some words in a sentence, in the training of the model. Each word in the corpus data can be understood as a minimum unit into which each sentence is split after one sentence is segmented. The UNK is used for representing an unlisted word, such as an unknown token.

In both the original data dictionary and the target data dictionary, words can be ranked by using word frequencies, and then a corresponding word is given one identification ID according to its ranking position, for performing coding transformation on the input sentence.

In the step S33, the performing embedded coding processing on the pinyin data of the corpus data to obtain embedding vector data comprises: performing random masking processing on at least one pinyin in the pinyin data of the corpus data to obtain randomly masked pinyin data; and performing embedded coding processing on the randomly masked pinyin data to obtain the embedding vector data.

In some embodiments, performing random masking on the pinyin data of the corpus data comprises: randomly determining at least one pinyin to be masked; and performing random masking processing on the at least one pinyin.

For example, in the training process, a certain proportion of tokens (a token may be pinyin corresponding to a word) are randomly masked. During training of the model, one sentence can be fed multiple times into the model for parameter learning.

After the pinyin to be masked is determined, the performing random masking processing on the at least one pinyin comprises: masking the at least one pinyin with a first probability, replacing the at least one pinyin with similar pinyin with a second probability, and changing tone of the at least one pinyin with a third probability. A sum of the first, second and third probabilities may not be 1. For example, the at least one pinyin may remain unchanged with a fourth probability. A specific proportion of each probability can be adjusted according to actual conditions.

Taking an input of "sou3 ji1 mei2 dian4 le5" as an example, assuming that 20% of pinyin is randomly masked, the masked pinyin can be directly masked by [MASK] with a probability of 40%, replaced with similar pinyin with a probability of 30%, tone-changed with a probability of 20%, and original pinyin is retained with a probability of 10%, and a result of the random masking is as follows.

40%: sou3 ji1 mei2 dian4 le5->sou3 ji1 [MASK] dian4 le5
30%: sou3 ji1 mei2 dian4 le5->shou3 ji1 mei2 dian4 le5
20%: sou3 ji1 mei2 dian4 le5->sou3 ji1 mei3 dian4 le5
10%: sou3 ji1 mei2 dian4 le5->sou3 ji1 mei2 dian4 le5

In the above embodiment, randomly masking partial pinyin enables maintaining distributed characterization of each input pinyin, to improve accuracy of the model. Because the model will remember that [MASK] corresponds to certain pinyin in a sentence if the certain pinyin will be masked with 100%, the model will encounter an unseen word in possible subsequent training such as fine-tuning, which will reduce the accuracy of the model. In addition, randomly replacing similar pinyin and changing a pinyin tone can enable the model to automatically correct input wrong pinyin, so that the accuracy of the model is further improved.

Next, embedded coding processing on the randomly masked pinyin data is performed to obtain the embedding vector data.

For example, first, embedded coding processing is performed on the randomly masked pinyin data to obtain a first embedding matrix and a second embedding matrix. Then, the embedding vector data is determined according to the first embedding matrix and the second embedding matrix.

In some embodiments, the first embedding matrix is a token embedding matrix and the second embedding matrix is a position embedding matrix, the embedding vector data being in linear correlation with the first embedding matrix and the second embedding matrix.

For example, first, data $X=(x_1, x_2, \ldots, x_n)$ is encoded into a token embedding matrix $W_t$ and a position embedding matrix $W_p$. Here, X may be original pinyin data or randomly masked pinyin data. In addition, since each subtask for the training of the model can be directed only to a single sentence that is inputted, without the need to a plurality of sentences that are inputted simultaneously, e.g., sentences A and B, it is not needed to segment embedding matrix $W_s$ to distinguish whether each word belongs to the sentence A or B. i.e., $W_s$ may be 0.

In some embodiments, element values in the first embedding matrix and the second embedding matrix are training parameters of the natural language processing model. For example, element values in the token embedding matrix $W_t$ are always learnable in the training process. The position embedding matrix $W_p$ is learnable in a pre-training process, and can remain unchanged in training for subsequent tasks such as fine-tuning.

Then, the aforementioned embedding matrices may be added as the input embedding vector data, denoted by $h_0$. For example, $h_0 = XW_t + W_p$. The input embedding vector data $h_0$ is taken as input data of the first model.

Next, in the step S34, the embedding vector data is processed by using the first model to obtain corrected pinyin data. The above embedding vector data $h_0$ is, for example, an input to the first coding module of the first model, and an input to other subsequent1 coding modules may be vector data $h_l$ represented by text semantics and obtained through, for example, Transformer networks of N1 layers according to the embedding vector data h0:

$$h_l = \text{Transformer}(h_{l-1}), l \in [1, N1],$$

where $h_l$ is a hidden-layer vector, i.e. an output of a Transformer network of an lth layer.

Then, in the step S35, pinyin-to-text transformation on the corrected pinyin data is performed by using the second model.

As previously described, the second model may comprise N2 coding modules, e.g., Transformer networks of N2 layers. Accordingly, for an input to each coding module, a similar representation may also be adopted, i.e. $h_l = \text{Transformer}(h_{l-1}), l \in [1, N2]$.

How to train the natural language processing model according to the output information of the natural language processing model is further described in detail below in conjunction with FIG. 4.

Figure 4:
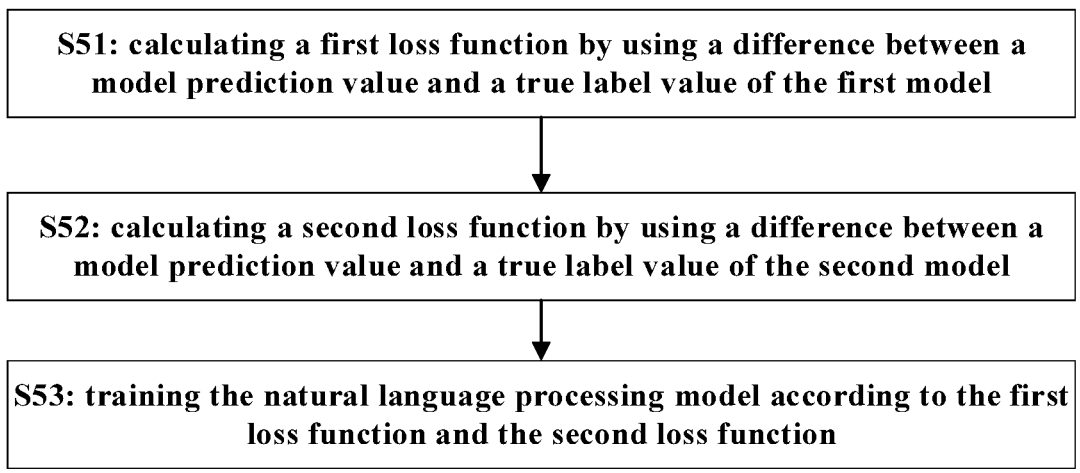
FIG. 4 is a flow diagram illustrating training the natural language processing model according to output information of the natural language processing model according to some embodiments of the present disclosure.

As shown in FIG. 4, the training the natural language processing model according to the output information of the natural language processing model to obtain the trained natural language processing model comprises: step S51, calculating a first loss function by using a difference between a model prediction value and a true label value of the first model; step S52, calculating a second loss function by using a difference between a model prediction value and a true label value of the second model; and step S53, training the natural language processing model according to the first loss function and the second loss function.

In the step S51, for the at least one pinyin that is randomly masked, the first loss function may be calculated by using the difference between the model prediction value and the true label value of the first model.

In some embodiments, the first model further comprises, in addition to the N1 coding modules, a first fully-connected layer and a first activation function layer, for learning and predicting each randomly masked pinyin. For example, calculating the first loss function comprises calculating the first loss function by using a cross-entropy loss function based on the size of the original data dictionary constructed based on the pinyin data of the corpus data.

In some embodiments, the model prediction value may be represented as $$\tilde{y} = \sigma 1(\text{Dense1}_{unit=src\_vocab\_size}(h_{N1})),$$

where Dense1 is the first fully-connected layer, $\sigma 1$ is the first activation function layer, e.g., a softmax activation function, and the src_vocab_size is the size of the original data dictionary.

For example, the first loss function may be represented as $$\text{loss}_{error} = -\Sigma_i^M y_i \log(\tilde{y}_i),$$

where $y_i$ and $\tilde{y}_i$ respectively represent a true label value and a model prediction value at an ith position (e.g., an ith pinyin), and M represents a set of all randomly masked pinyin. Here, the first loss function is predicted and calculated only for the randomly masked pinyin.

In the step S52, for the pinyin data of the corpus data, the second loss function is calculated by using the difference between the model prediction value and the true label value of the second model.

In some embodiments, the second model further comprises, in addition to the N2 coding modules, a second full-connected layer and a second activation function layer, for learning and predicting a correspondence between pinyin and word, for example, a Chinese character corresponding to each pinyin position. For example, calculating the second loss function comprises calculating the second loss function by using a cross-entropy loss function according to the size of the target data dictionary constructed based on the corpus data.

In some embodiments, the model prediction value may be represented as $$\tilde{z} = \sigma 2(\text{Dense2}_{unit=tgt\_vocab\_size}(h_{N2}))$$

where Dense2 is the second fully-connected layer, $\sigma 2$ is the second activation function layer, e.g., a softmax activation function, and the tgt_word_size is the size of the target data dictionary.

For example, the second loss function may be represented as $$\text{loss}_{word} = -\Sigma_i^L z_i \log(\tilde{z}_i)$$

where $z_i$ and $\tilde{z}_i$ respectively represent a true label value and a model prediction value at the ith position, and L represents a length of an input pinyin sequence. Here, the second loss function is predicted and calculated for all the inputs.

Then, in the step S53, the natural language processing model is trained based on a weighted sum of the first loss function and the second loss function.

For example, a final loss function of the model may be represented as a sum of the first loss function and the second loss function, i.e. $\text{loss} = \text{loss}_{error} + \text{loss}_{word}$. An optimization goal of the model is to minimize the final loss function loss.

How to train a natural language processing model is specifically described below in conjunction with a structure of the natural language processing model according to other embodiments of the present disclosure shown in FIG. 5.

Figure 5:
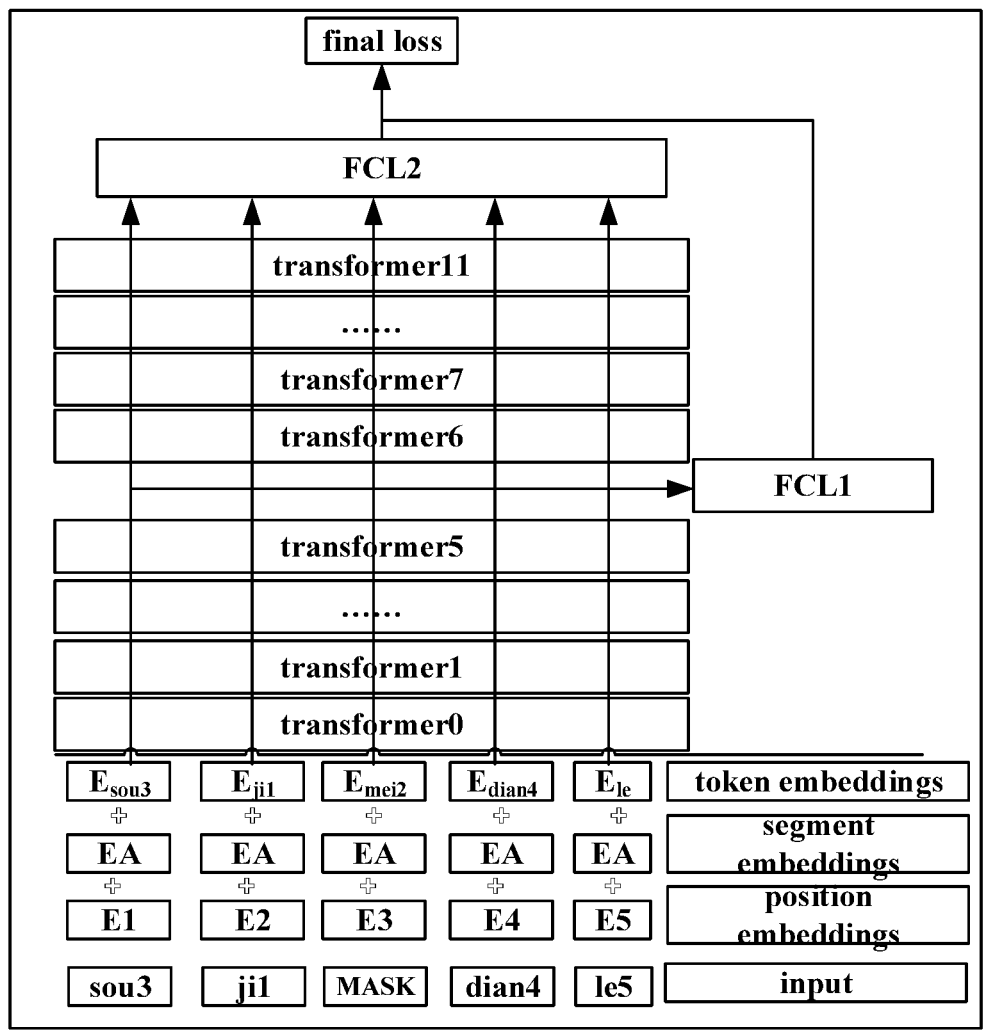
FIG. 5 is a schematic diagram illustrating a natural language processing model according to other embodiments of the present disclosure.

The structures of the natural language processing models of FIG. 5 and FIG. 2 differ from each other only in that, the first model further comprises a first fully-connected layer FCL1 and the second model further comprises a second fully-connected layer FCL2. The following description will focus on the differences, and similarities will not be repeated.

As shown in FIG. 5, after the pinyin data "sou3 ji1 mei2 dian4 le5" of the inputted corpus data is subjected to coding processing of token embedding, segment embedding, and position embedding, corresponding embedding matrices, i.e., the token embedding matrix $W_t$ and the position embedding matrix $W_p$, are respectively obtained. Because only one sentence is inputted, all pinyin belongs to the sentence A, such as EA shown in FIG. 5, for which an element of a corresponding segmentation embedding matrix is 0.

As shown in FIG. 5, the embedding vector data determined according to the first embedding matrix and the second embedding matrix is inputted into the first model, and after it is outputted by the last coding module of the first model, e.g., the transformer 5, each randomly masked word is learned and predicted with the first full-connected layer FCL1. Moreover, based on the result of the prediction, the first loss function is calculated.

The pinyin after corrected by the first model is inputted into the second model for pinyin-to-word transformation. After it is outputted by the last coding module of the second model, e.g., the transformer 11, text corresponding to each pinyin position is learned and predicted with the second full-connected layer FCL2. Moreover, based on the result of the prediction, the second loss function is calculated. Then, the final loss function of the model is calculated based on the first loss function and the second loss function, and the model is trained by minimizing the final loss function.

In the above embodiment, the natural Language processing model is trained by using a masked language modeling (MLM) task, but that differs from BERT in that the embodiment of the present disclosure does not include a next sentence prediction (NSP) task, but a task of pinyin correction by using the first model is added. In addition, the training task of the embodiment of the present disclosure may be a pre-training task, to which fine-tuning according to other tasks may be added subsequently; and may also be taken as an independent training task to independently perform pinyin correction and text transformation.

The natural language processing model is trained by using the method according to any of the above embodiments, for example, the steps S1 to S5, to obtain the trained natural language processing model. On this basis, corpus data to be processed can be processed by using the trained natural language processing model.

For example, the trained natural language processing model is loaded, and pinyin correction and pinyin-to-word transformation are performed on actual ASR-recognized data. In some embodiments, a final output result of the model may be normalized, and a value with a maximum probability at a position corresponding to each pinyin may be taken as a target result by using a softmax function, and final text may be obtained by indexing the target data dictionary.

Figure 6:
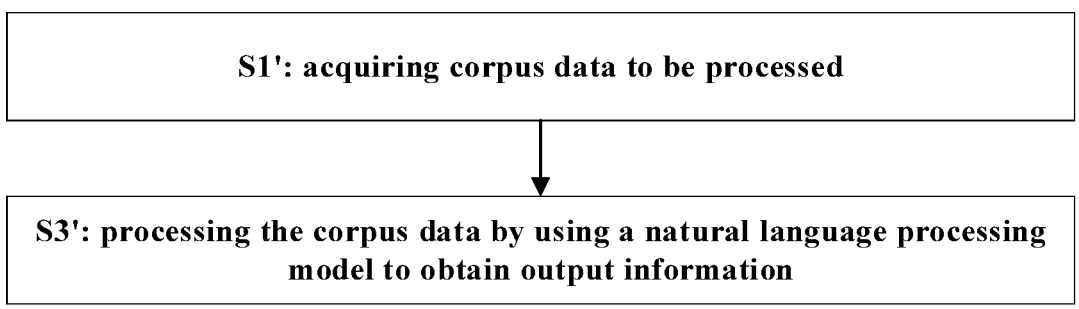
FIG. 6 is a flow diagram illustrating a method of natural language processing according to some embodiments of the present disclosure.

According to some embodiments of the present disclosure, there is further provided a method of natural language processing. FIG. 6 is a flow diagram illustrating a method of natural language processing according to some embodiments of the present disclosure.

As shown in FIG. 6, the method of natural language processing comprises: step S1', acquiring corpus data to be processed; and step S3', processing the corpus data by using a natural language processing model to obtain output information.

In the step S1', the corpus data to be processed is, for example, actual ASR-recognized data.

In the step S3', the natural language processing model comprises a first model and a second model, wherein the first model is used for correcting pinyin data of the corpus data, and the second model is used for performing text transformation on the corrected pinyin data of the corpus data. The processing of the step S3' is similar to that of the step S3 in FIGS. 1 to 3, which will not be repeated here.

In the above embodiments, the method of training a natural language processing model and the method of natural language processing are provided, which can improve accuracy of natural language processing.

By use of the natural language processing model trained according to the embodiments of the present disclosure, the accuracy of the ASR recognition effect can be stably increased by at least 3 percent on a plurality of public corpus data sets.

The foregoing method of natural language processing can, as needed, be applied to various scenarios, for example, speech recognition, pinyin input, and the like.

Figure 6A:
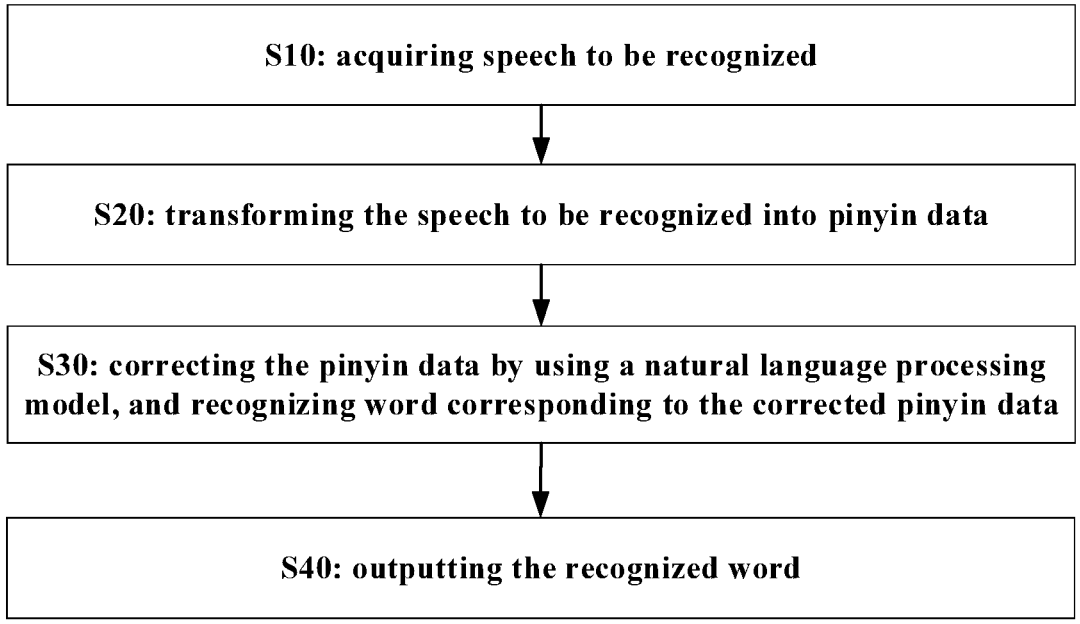
FIG. 6A is a flow diagram illustrating a method of speech recognition according to some embodiments of the present disclosure.

FIG. 6A is a flow diagram illustrating a method of speech recognition according to some embodiments of the present disclosure.

As shown in FIG. 6A, the method of speech recognition comprises: step S10, acquiring speech to be recognized; step S20, transforming the speech to be recognized into pinyin data; step S30, correcting the pinyin data by using a natural language processing model, and recognizing word corresponding to the corrected pinyin data; and step S40, outputting the recognized word.

In the step S10, the speech to be recognized includes, for example, voices received in a process of speech interaction, which may be various languages including, but not limited to, Chinese and Japanese. The speech to be recognized may be acquired by a device such as a microphone.

In the step S20, the transformed pinyin data is not limited to Chinese pinyin and romaji in Japanese, and may also be suitable for other languages with similar characteristics.

In the step S30, the natural language processing model comprises a first model and a second model, wherein the first model is used for correcting the pinyin data, and the second model is used for performing text transformation on the corrected pinyin data. The structure and training method of the natural language processing model have been described in detail in the foregoing embodiments, and will not be repeated here.

In the step S40, the recognized word may be outputted by using, for example, a display. In some embodiments, the method of speech recognition further comprises outputting the corrected pinyin data. That is, the natural language processing model may output the final recognition result or the intermediate processing result of the model.

Figure 6B:
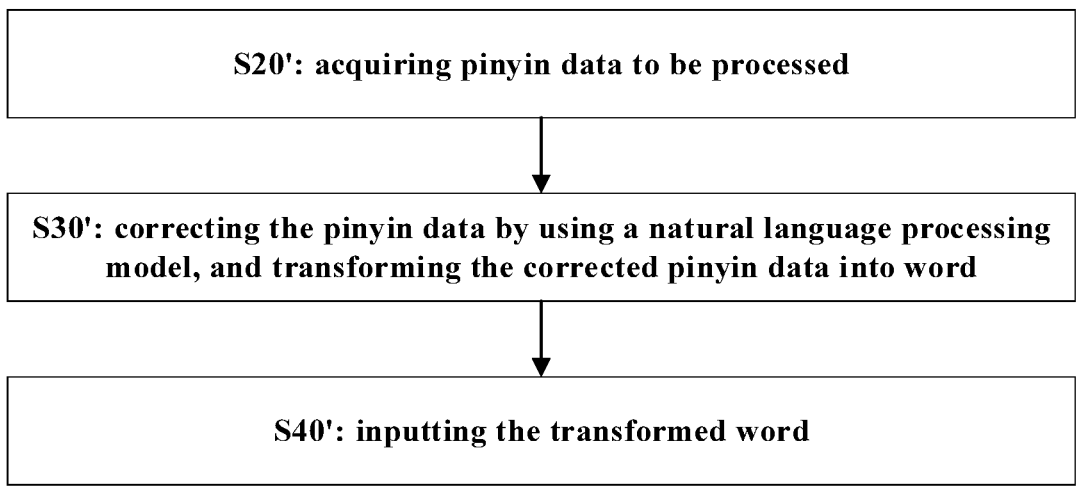
FIG. 6B is a flow diagram illustrating a method of word input according to some embodiments of the present disclosure.

FIG. 6B is a flow diagram illustrating a method of text input according to some embodiments of the present disclosure.

As shown in FIG. 6B, the method of text input comprises: step S20', acquiring pinyin data to be processed; step S30', correcting the pinyin data by using a natural language processing model, and transforming the corrected pinyin data into word; and step S40', inputting the transformed word.

In the step S20', the pinyin data to be processed is not limited to Chinese pinyin and romaji in Japanese, and may also be suitable for other languages with similar characteristics. The pinyin data to be processed may be acquired by, for example, keyboard input.

In the step S30', the natural language processing model comprises a first model and a second model, wherein the first model is used for correcting the pinyin data, and the second model is used for performing text transformation on the corrected pinyin data. The structure and training method of the natural language processing model have been described in detail in the foregoing embodiments, and will not be repeated here.

In step S40', the inputted word may be displayed by using, for example, a display. In some embodiments, the method of text input further comprises outputting the corrected pinyin data. That is, the natural language processing model may output the final recognition result or the intermediate processing result of the model. So far, various method embodiments of the present disclosure have been described in detail, and corresponding product embodiments will be described below. An embodiment of the present disclosure further provides an electronic device.

Figure 7:
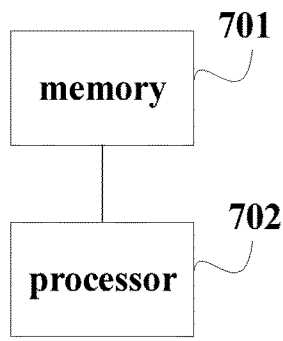
FIG. 7 is a block diagram illustrating an electronic device according to one embodiment of the present disclosure.

FIG. 7 is a block diagram illustrating an electronic device according to one embodiment of the present disclosure.

As shown in FIG. 7, the electronic device 70 comprises: a memory 701 and a processor 702 coupled to the memory 701. The memory 701 is configured to store instructions of the corresponding embodiments performing the method for natural language processing or the method of training a natural language processing model. The processor 702 is configured to perform, based on instructions stored in the memory 701, one or more steps of the method in any of the embodiments of the present disclosure.

It should be understood that one or more steps of the foregoing method of training a natural language processing model or method of natural language processing may be implemented by a processor, and may be implemented by any of software, hardware, firmware, or a combination thereof.

In addition to the method of natural language processing or the method of training a natural language processing model, and the electronic device, the embodiments of the present disclosure may also take a form of a computer program product implemented on one or more non-volatile storage media containing computer program instructions. Accordingly, the embodiments of the present disclosure further provide a computer-readable storage medium having thereon stored computer instructions which, when executed by a processor, implement one or more steps of the method in any of the foregoing embodiments.

Figure 8:
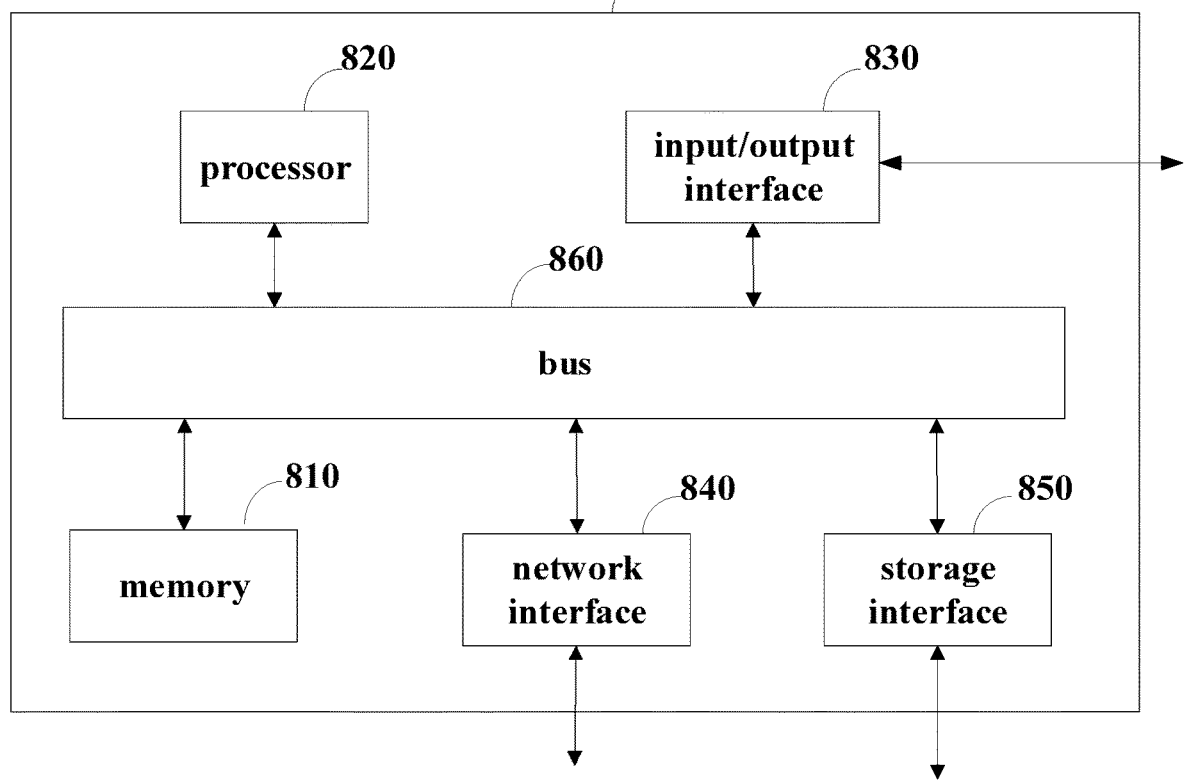
FIG. 8 is a block diagram illustrating a computer system for implementing some embodiments of the present disclosure.

FIG. 8 is a block diagram illustrating a computer system for implementing some embodiments of the present disclosure.

As shown in FIG. 8, the computer system may be represented in a form of a general-purpose computing device, and the computer system may be used for implementing the electronic device of the above embodiments. The computer system comprises a memory 810, a processor 820, and a bus 800 connecting different system components.

The memory 810 may include, for example, a system memory, non-volatile storage medium, and the like. The system memory has thereon stored, for example, an operating system, an application, a boot loader, other programs, and the like. The system memory may include a volatile storage medium, such as a random access memory (RAM) and/or cache memory. The non-volatile storage medium has thereon stored, for example, instructions of the corresponding embodiments performing the method according to the present disclosure. The non-volatile storage medium includes, but is not limited to, a magnetic disk memory, optical memory, flash memory, and the like.

The processor 820 may be implemented by using a general-purpose processor, a digital signal processor (DSP), an application specific integrated circuit (ASIC), a field programmable gate array (FPGA) or other programmable logic devices, discrete hardware components such as a discrete gate or transistor. Accordingly, each device, such as the judgment device and the determination device, may be implemented by running, by a central processing unit (CPU), the instructions in the memory that perform the corresponding steps, or by a dedicated circuit performing the corresponding steps.

The bus 800 may use any of a variety of bus structures. For example, the bus structure includes, but is not limited to, an industry standard architecture (ISA) bus, micro channel architecture (MCA) bus, and peripheral component interconnect (PCI) bus.

The computer system may also include an input/output interface 830, network interface 840, storage interface 850, and the like. These interfaces 830, 840, 850, as well as the memory 810 may be connected with the processor 820 via the bus 800. The input/output interface 830 may provide a connection interface for input/output devices such as a display, a mouse, and a keyboard. The network interface 840 provides a connection interface for a variety of networking devices. The storage interface 840 provides a connection interface for external storage devices such as a floppy disk, a USB flash disk, and an SD card.

So far, various embodiments of the present disclosure have been described in detail. Some details well known in the art have not been described in order to avoid obscuring the concepts of the present disclosure. Those skilled in the art can fully appreciate how to implement the technical solutions disclosed herein according to the foregoing description.

Although some specific embodiments of the present disclosure have been described in detail by the examples, it should be understood by those skilled in the art that the above examples are for illustration only and are not intended to limit the scope of the present disclosure. It should be understood by those skilled in the art that the above embodiments can be modified or partial technical features can be equivalently replaced without departing from the scope and spirit of the present disclosure. The scope of the present disclosure is defined by the attached claims.

What is claimed is:

1. A method of training a natural language processing model, comprising:
    acquiring corpus data for training;
    processing the corpus data by using a natural language processing model to obtain output information, wherein the natural language processing model comprises a first model for correcting pinyin data of the corpus data and a second model for performing text transformation on the corrected pinyin data of the corpus data; and
    training the natural language processing model according to the output information of the natural language processing model to obtain the trained natural language processing model;
    wherein the processing the corpus data by using a natural language processing model to obtain output information comprises:

transforming the corpus data into pinyin data;
for the pinyin data of the corpus data, constructing a similar pinyin set;
performing embedded coding processing on the pinyin data of the corpus data to obtain embedding vector data;
processing the embedding vector data by using the first model to obtain the corrected pinyin data; and performing pinyin-to-word transformation on the corrected pinyin data by using the second model.

2. The method according to claim 1, wherein the training the natural language processing model according to the output information of the natural language processing model to obtain the trained natural language processing model comprises:
calculating a first loss function by using a difference between a model prediction value and a true label value of the first model;
calculating a second loss function by using a difference between a model prediction value and a true label value of the second model; and
training the natural language processing model according to the first loss function and the second loss function.

3. The method according to claim 1, wherein the performing embedded coding processing on the pinyin data of the corpus data to obtain embedding vector data comprises:
performing random masking processing on at least one pinyin in the pinyin data of the corpus data to obtain randomly masked pinyin data; and
performing embedded coding processing on the randomly masked pinyin data to obtain the embedding vector data.

4. The method according to claim 3, wherein the randomly masking the pinyin data of the corpus data comprises:
randomly determining at least one pinyin to be masked; and the performing
random masking processing on the at least one pinyin.

5. The method according to claim 4, wherein the performing random masking processing on the at least one pinyin comprises:
masking the at least one pinyin with a first probability, replacing the at least one pinyin with similar pinyin with a second probability, and changing tone of the at least one pinyin with a third probability.

6. The method according to claim 3, wherein the training the natural language processing model according to the output information of the natural language processing model to obtain the trained natural language processing model comprises:
for the at least one pinyin that is randomly masked, calculating a first loss function by using a difference between a model prediction value and a true label value of the first model;
for the pinyin data of the corpus data, calculating a second loss function by using a difference between a model prediction value and a true label value of the second model; and
training the natural language processing model according to a weighted sum of the first loss function and the second loss function.

7. The method according to claim 6, wherein:
the calculating the first loss function comprises calculating the first loss function by using a cross-entropy loss function according to a size of an original data dictionary constructed based on the pinyin data of the corpus data; and
the calculating the second loss function comprises calculating the second loss function by using a cross-entropy loss function according to a size of a target data dictionary constructed based on the corpus data.

8. The method according to claim 1, wherein the first model comprises N1 coding modules and the second model comprises N2 coding modules, the second model further comprising, in addition to the N1 coding modules of the first model, an additional coding module, wherein N1, N2 are positive integers greater than 1, N2>N1, the N1 coding modules are connected in series, and the N2 coding modules are connected in series.

9. The method according to claim 1, wherein the constructing, for the pinyin data of the corpus data, a similar pinyin set comprises:
constructing the similar pinyin set based on a correspondence between fuzzy sounds and based on an edit distance.

10. The method according to claim 3, wherein the performing embedded coding processing on the randomly masked pinyin data to obtain embedding vector data comprises:
performing embedded coding processing on the randomly masked pinyin data to obtain a first embedding matrix and a second embedding matrix; and
determining the embedding vector data according to the first embedding matrix and the second embedding matrix.

11. The method according to claim 10, wherein the first embedding matrix is a token embedding matrix and the second embedding matrix is a position embedding matrix, the embedding vector data being in linear correlation with the first embedding matrix and the second embedding matrix.

12. The method according to claim 11, wherein element values in the first embedding matrix and the second embedding matrix are training parameters of the natural language processing model.

13. A method of natural language processing, comprising:
acquiring the corpus data to be processed; and
processing the corpus data by using the natural language processing model to obtain output information, wherein the natural language processing model is trained using the method according to claim 1 and comprises the first model for correcting the pinyin data of the corpus data and a second model for performing text transformation on the corrected pinyin data of the corpus data.

14. A method of natural language processing, comprising:
training the natural language processing model by using the method according to claim 1 to obtain the trained natural language processing model;
and processing corpus data to be processed by using the trained natural language processing model.

15. A method for speech recognition, comprising:
acquiring speech to be recognized;
transforming the speech to be recognized into pinyin data;
correcting the pinyin data by using the natural language processing model, and recognizing word corresponding to the corrected pinyin data, wherein the natural language processing model is trained using the method according to claim 1 and comprises the first model for correcting the pinyin data and the second model for performing text transformation on the corrected pinyin data; and
outputting the recognized word.

16. The method according to claim 13, wherein:
the method of natural language processing is a method for text input;
the corpus data comprises the pinyin data;
the processing the corpus data comprises correcting the pinyin data by using the natural language processing model, and transforming the corrected pinyin data into word; and
the method further comprises inputting the transformed word.

17. The method according to claim 15, further comprising:
outputting the corrected pinyin data.

18. An electronic device, comprising:
a memory; and
a processor coupled to the memory, the processor being configured to perform, based on instructions stored in the memory, the method according to claim 1.

19. A non-transitory computer-storable medium having thereon stored computer program instructions which, when executed by a processor, implement the method according to claim 1.

* * * * *